Patented Feb. 4, 1930

1,746,190

UNITED STATES PATENT OFFICE

DENIS P. J. BURGUIERES, OF LOUISA, LOUISIANA

METHOD OF RIPENING SUGAR CANE

No Drawing. Application filed February 13, 1928. Serial No. 254,170.

My present invention relates to an improved method of increasing the sucrose contents of the stalks of sugar cane, or as it is commonly called, ripening the cane.

In tropical countries, the canes are allowed to grow until they tassel or reach maturity, at which time the stalks contain a large percentage of sucrose, or are ripe.

Where cane is grown in sub-tropical countries, such as Louisiana, Texas, Argentina, and Australia, the canes frequently do not ripen at all, but are usually killed before maturity by frost, and the process of ripening is prematurely affected by the advent of cool or cold weather, which affects the formation of chlorophyl in the leaves of the growing cane, and checks the growth of the stalks causing the increase of sucrose contents therein, or ripening the cane.

Where the weather continues warm, and the warm spell is followed by a freeze, the cane does not ripen at all, and remains green, by which we mean possessing a relatively small sucrose content.

According to my invention, I accomplish artificially the checking of the growth of the stalks with the consequent ripening of the cane by supplying to the tops of the stalks a finely divided material which attacks, but does not destroy the "bud" of the cane, and which retards the formation of chlorophyl in the leaves, and consequently checks the growth of the cane. This arrested growth results in the material increase in the sucrose contained in the stalks after such treatment.

I have found suitable substances for this purpose mixtures containing lime, caustic potash, common salt, weak solutions of sulphuric or hydrochloric acid and certain other solids in the finely divided form or liquids or gases, which when properly applied, will check the growth of the plants and ripen same, as described.

These substances may be applied in the powdered form, as with unslaked lime sprayed over the tops of the growing plants or may be applied in the form of liquid sprays, such as a saline solution or weak acid solution.

If applied in the solid form in the shape of a powder, the powder will sift down into the bud of the cane, and will become moistened by dew or rain, and affect the development of the bud. If the material is applied in the form of a liquid spray, the peculiar formation of the cane top will cause this spray to run down into the bud of the cane and arrest its growth.

The material may be applied in the powder or liquid form, preferably by airplanes, since the time when this treatment is desirable is when the cane is nearly ripe and the field becomes a tangled mass and it is difficult, if not impossible, to get through it on the land with any suitable device for spraying the tops of the stalks.

While one treatment with material of a sufficient strength may suffice, several treatments with material having lesser strength may produce better results. Moreover the strength of the material used in the treatment will vary according to the condition of the cane stalks to be treated.

Of course, this treatment should only begin when the stalks have nearly reached full growth, or are nearly ready for the harvest, and should not be applied upon those cane stalks that are cut down and kept for "seed."

Where the material is dusted on in the powdered form, it would be preferable to apply same in comparatively calm weather, either in the evening before the dew settles on the plants, or early in the morning, while the dew is still on the plants, for this dew will serve as a solvent for the powder and will enable the retarding material to promptly reach the bud of the cane where it will get in its work.

Where the material is applied in the form of liquid sprays, it would be preferable to spray the same over the tops of the plants in the calm of the evening, before the dew falls.

Obviously only a small quantity of the active material need reach the bud of each plant to materially check the growth of, but not kill the plant. This checked growth, as before stated, will cause nature to devote part of the energy formerly expended in the development of the leaves in the production of sucrose in the stalks.

While I have described various substances, which may be used in the powdered or liquid form, I prefer powdered lime in the slaked or unslaked condition, because of its cheapness and of the facility with which it may be applied, and moreover, because the larger proportion of the lime is scattered over the soil and does not reach the bud, which will have a beneficial effect upon the soil, serving not only to ripen the cane, but also to improve the soil.

Having thus described my invention, what I claim and desire to secure by Letters Patent of the United States is:—

1. The method of ripening sugar cane, which consists in treating the tops of the still growing plants with a finely divided substance that will artificially arrest the growth thereof.

2. The method of ripening sugar cane, which consists in treating the tops of the still growing plants with a finely divided substance that will retard the formation of chlorophyl of the leaves and artificially check the growth of the plant.

3. The method of ripening sugar cane, which consists in treating the tops of the still growing plants with small quantities of a finely divided alkaline substance thereby artificially checking the growth thereof.

4. The method of ripening sugar cane, which consists in treating the tops of the still growing plants with small quantities of finely divided lime, thereby artificially checking the growth thereof.

5. The method of ripening sugar cane, which consists in spraying over the tops of the still growing plants finely divided unslaked lime, thereby artificially checking the growth thereof.

6. The method of ripening sugar cane, which consists in spraying over the tops of the still growing plants a finely divided solid substance that will artificially arrest the growth thereof.

7. The method of ripening sugar cane, which consists in spraying over the tops of the still growing plants a finely divided solid substance that will retard the formation of chlorophyl of the leaves and artificially check the growth of the plant.

8. The method of ripening sugar cane, which consists in spraying over the tops of the still growing plants small quantities of a finely divided solid alkaline substance thereby artificially checking the growth thereof.

9. The method of ripening sugar cane, which consists in spraying over the tops of the still growing plants with small quantities of a finely divided solid substance containing lime, thereby artificially checking the growth thereof.

DENIS P. J. BURGUIERES.